US011823844B2

(12) United States Patent
Kim et al.

(10) Patent No.: US 11,823,844 B2
(45) Date of Patent: Nov. 21, 2023

(54) CAPACITOR COMPONENT

(71) Applicant: SAMSUNG ELECTRO-MECHANICS CO., LTD., Suwon-si (KR)

(72) Inventors: Jung Min Kim, Suwon-si (KR); Hong Je Choi, Suwon-si (KR); Ji Hye Han, Suwon-si (KR); Byung Woo Kang, Suwon-si (KR); Hye Jin Park, Suwon-si (KR); Sang Wook Lee, Suwon-si (KR); Bon Seok Koo, Suwon-si (KR); Jung Won Lee, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 214 days.

(21) Appl. No.: 17/572,176

(22) Filed: Jan. 10, 2022

(65) Prior Publication Data
US 2023/0094110 A1 Mar. 30, 2023

(30) Foreign Application Priority Data
Sep. 30, 2021 (KR) .......................... 10-2021-0129627

(51) Int. Cl.
*H01G 4/30* (2006.01)
*H01G 4/012* (2006.01)
(Continued)

(52) U.S. Cl.
CPC ............... *H01G 4/30* (2013.01); *H01G 4/008* (2013.01); *H01G 4/012* (2013.01); *H01G 4/12* (2013.01); *H01G 4/2325* (2013.01)

(58) Field of Classification Search
CPC .......... H01G 4/008; H01G 4/012; H01G 4/12; H01G 4/2325; H01G 4/30
See application file for complete search history.

(56) References Cited

U.S. PATENT DOCUMENTS

2008/0239617 A1* 10/2008 Motoki .................. H01G 4/30
29/25.42
2015/0136463 A1* 5/2015 Lee ........................ H01G 4/232
361/301.4
(Continued)

FOREIGN PATENT DOCUMENTS

JP       2019-220602 A    12/2019
KR       10-1474168 B1    12/2014
KR    10-2017-0118584 A   10/2017

*Primary Examiner* — Nathan Milakovich
(74) *Attorney, Agent, or Firm* — Morgan, Lewis & Bockius LLP

(57) ABSTRACT

A capacitor component includes a body including a dielectric layer and an internal electrode layer; and an external electrode disposed on one surface of the body, wherein the external electrode includes first electrode layers disposed on the one surface of the body to be spaced apart from each other, and covering a region of the one surface of the body through which the internal electrode layer is exposed; a second electrode layer including a base resin and a conductive connection portion disposed in the base resin, and disposed on the one surface of the body to cover the first electrode layers; and an intermetallic compound disposed only between each of the first electrode layers and the second electrode layer.

35 Claims, 4 Drawing Sheets

(51) Int. Cl.
*H01G 4/12* (2006.01)
*H01G 4/232* (2006.01)
*H01G 4/008* (2006.01)

(56) References Cited

U.S. PATENT DOCUMENTS

2017/0301468 A1* 10/2017 Kim .................... H01G 4/30
2018/0033540 A1* 2/2018 Lee .................... H01F 27/292
2018/0286594 A1* 10/2018 Kim .................... H01G 4/248
2019/0392991 A1 12/2019 Harada

* cited by examiner

I-I'

CAPACITOR COMPONENT

CROSS-REFERENCE TO RELATED APPLICATION(S)

This application claims the benefit of priority to Korean Patent Application No. 10-2021-0129627 filed on Sep. 30, 2021 in the Korean Intellectual Property Office, the disclosure of which is incorporated herein by reference in its entirety.

BACKGROUND

1. Technical Field

The present disclosure relates to a capacitor component.

2. Description of Related Art

Capacitor components are important chip components used in industries such as communications, computing, home appliances, automobiles, and the like, due to their small size, high capacity, and ease of mounting, and, in particular, are key passive elements used in various electric, electronic, and information communication devices such as mobile phones, computers, digital TVs, or the like.

Recently, with the miniaturization and implementation of high performance in electronic devices, capacitor components have also tended to be miniaturized and to have high capacity, and with this trend, the importance of securing high reliability of capacitor components is increasing.

As a method of securing high reliability of such capacitor components, in order to absorb tensile stress generated in a mechanical or thermal environment to prevent the occurrence of cracks caused by stress, a technique in which a conductive resin layer is applied to an external electrode is disclosed.

Such a conductive resin layer serves to form an electrical and mechanical bond between a sintered electrode layer and a plating layer in the external electrode of the capacitor component, and also serves to protect the capacitor component from mechanical and thermal stress according to a process temperature and bending impact of a substrate, during mounting of a circuit board.

In order to play this role, resistance of the conductive resin layer should be low, and adhesion between the electrode layer and the plating layer should be excellent to prevent a peeling phenomenon of the external electrode that may occur in the process.

However, since the conventional conductive resin layer has a high resistance, there is a problem in that equivalent series resistance (ESR) is high, compared to a product not having a conductive resin layer.

SUMMARY

An aspect of the present disclosure is to provide a capacitor component for improving bonding force and electrical connectivity between an internal electrode layer and an external electrode.

Another aspect of the present disclosure is to provide a capacitor component for reducing equivalent series resistance (ESR).

According to an aspect of the present disclosure, a capacitor component includes a body including a dielectric layer and an internal electrode layer; and an external electrode disposed on one surface of the body. The external electrode includes first electrode layers disposed on the one surface of the body to be spaced apart from each other, and covering a region of the one surface of the body through which the internal electrode layer is exposed; a second electrode layer including a base resin and a conductive connection portion disposed in the base resin, and disposed on the one surface of the body to cover the first electrode layers; and an intermetallic compound disposed only between each of the first electrode layers and the second electrode layer.

According to another aspect of the present disclosure, a capacitor component includes a body including a plurality of dielectric layers and a plurality of first and second internal electrode layers stacked with a dielectric layer interposed therebetween; and first and second external electrodes disposed on first and second surfaces of the body, respectively. Each of the first and second external electrodes comprises: first electrode layers disposed on the first or second surface of the body, connected to the first internal electrode layers or the second internal electrode layers, and spaced apart from each other; a second electrode layer including a base resin and a conductive connection portion disposed in the base resin, and disposed to cover the first electrode layers: and an intermetallic compound disposed between each of the first electrode layers and the second electrode layer.

According to still another aspect of the present disclosure, a capacitor component includes a body including a dielectric layer and an internal electrode layer; and an external electrode disposed on one surface of the body. The external electrode comprises: first electrode layers disposed on the one surface of the body to be spaced apart from each other, and connected to the internal electrode layer; a second electrode layer including a base resin and a conductive connection portion disposed in the base resin, and disposed to cover the first electrode layers; and an intermetallic compound disposed between each of the first electrode layers and the second electrode layer. The second electrode layer has a portion in contact with a region of the one surface of the body between adjacent first electrode layers that are spaced apart from each other.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
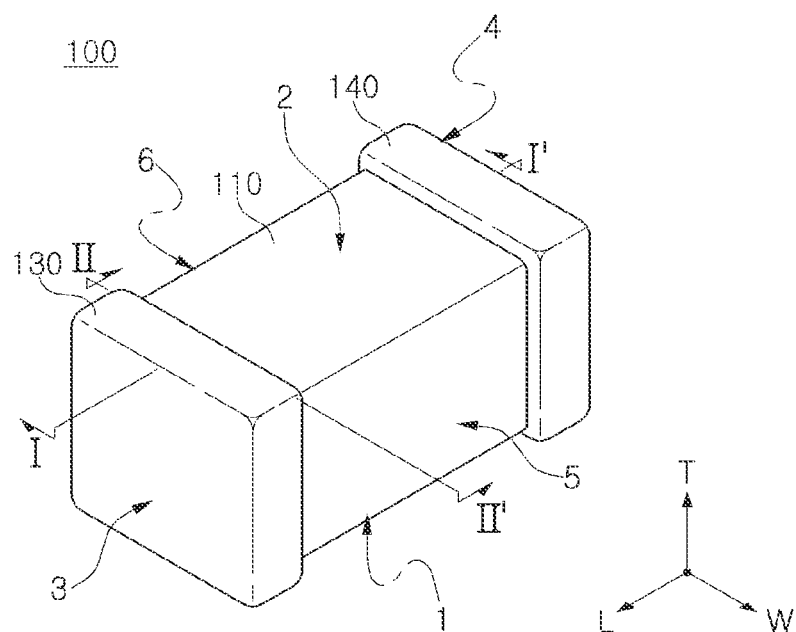
FIG. 1 is a view schematically illustrating a capacitor component according to an embodiment of the present disclosure.

Hereinafter, preferred embodiments of the present disclosure will be described with reference to the accompanying drawings.

However, embodiments of the present disclosure may be modified in various other forms, and the scope of the present disclosure is not limited to embodiments described below.

In addition, embodiments of the present disclosure may be provided in order to more completely explain the present disclosure to those of ordinary skill in the art.

Shapes and sizes of elements in the drawings may be exaggerated for clarity.

In addition, components having the same function within the scope of the same idea illustrated in the drawings of each embodiment will be described using the same reference numerals.

In addition, "including" a certain element throughout the specification refers that other elements may be further included, rather than excluding other elements, unless otherwise stated.

In addition, throughout the specification, "formed on" not only refers to being formed to be in direct contact, but also refers to a state in which other components may be further included therebetween, and should be properly interpreted according to context.

In order to clearly illustrate the present disclosure in the drawings, portions irrelevant to the description will be omitted, and a thickness may be enlarged to clearly express various layers and regions, and similar reference numerals may be used to refer to similar portions throughout the specification.

Figure 2:
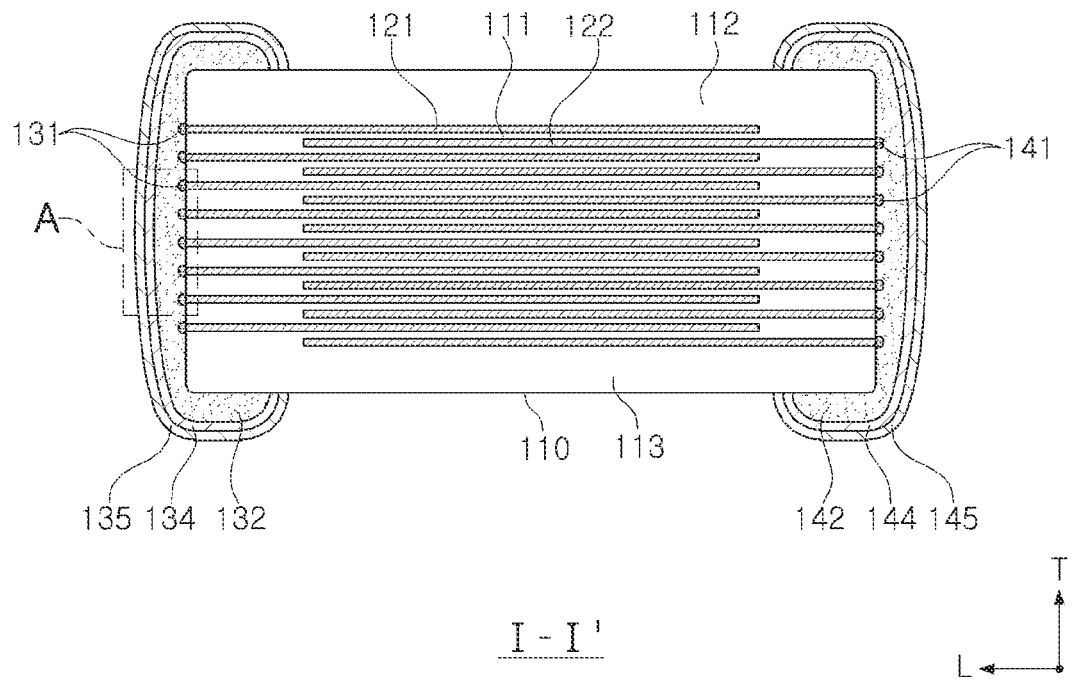
FIG. 2 is a view schematically illustrating the cross-section of FIG. 1, taken along line I-I'.
Figure 3:
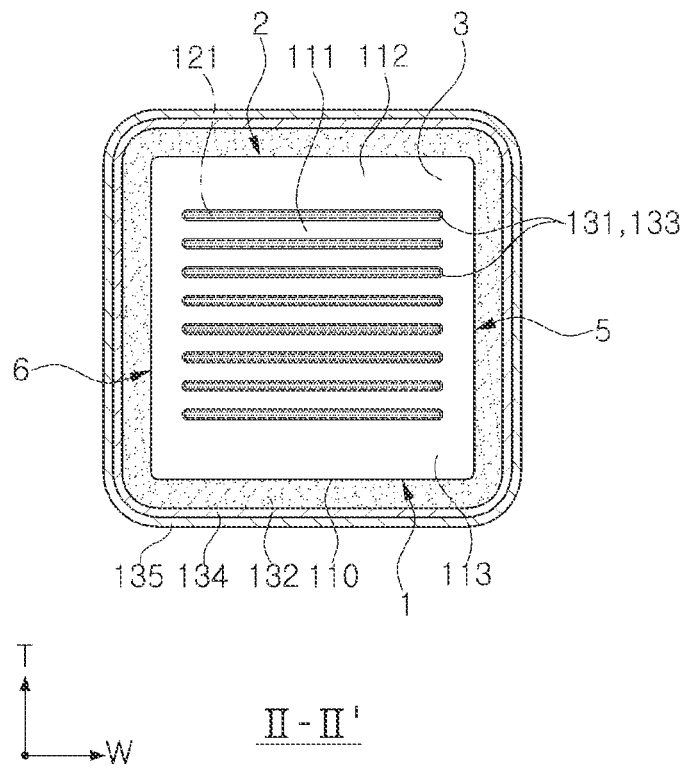
FIG. 3 is a view schematically illustrating the cross-section of FIG. 1, taken along line II-II'.

FIG. 1 is a view schematically illustrating a capacitor component according to an embodiment of the present disclosure. FIG. 2 is a view schematically illustrating a cross-section of FIG. 1, taken along line I-I'. FIG. 3 is a view schematically illustrating a cross-section of FIG. 1, taken along line II-II'.

Referring to FIGS. 1 and 2, a capacitor component 100 according to an embodiment of the present disclosure may include a body 110 and first and second external electrodes 130 and 140.

The body 110 may include an active region as a portion contributing to formation of capacitance of the capacitor component 100, and upper and lower covers 112 and 113 respectively formed on and below the active region as upper and lower margins.

In an embodiment of the present disclosure, the body 110 is not particularly limited in shape, but may have a substantially hexahedral shape. For example, the body 110 may not have a perfect hexahedral shape, but may have a substantially hexahedral shape, due to a difference in thickness according to arrangement of internal electrode layers 121 and 122, and polishing of corners.

When a direction of the hexahedral shape is defined to clarify an embodiment of the present disclosure, L, W, and T indicated in the drawings refer to a length direction, a width direction, and a thickness direction, respectively. In this case, the thickness direction may be used as a concept, identical to a concept of a stacking direction in which dielectric layers are stacked.

In addition, in the body 110, both surfaces opposing each other in the T direction may be defined as first and second surfaces 1 and 2, both surfaces connected to the first and second surfaces 1 and 2 and opposing each other in the L direction may be defined as third and fourth surfaces 3 and 4, and both surfaces connected to the first and second surfaces 1 and 2, connected to the third and fourth surfaces 3 and 4, and opposing each other in the W direction may be defined as fifth and sixth surfaces 5 and 6. In this case, the first surface 1 may be a mounting surface.

The active region may have a structure in which a plurality of dielectric layers 111, and a plurality of first and second internal electrode layers 121 and 122 are alternately stacked with a dielectric layer 111 interposed therebetween.

The dielectric layer 111 may be formed using a ceramic powder having a high dielectric constant, for example, a barium titanate ($BaTiO_3$)-based powder or a strontium titanate ($SrTiO_3$)-based powder, but the present disclosure is not limited thereto. In this case, for example, the formation of the dielectric layer 111 using a barium titanate ($BaTiO_3$)-based powder may mean that the barium titanate ($BaTiO_3$)-based powder is used as a main component, and a subcomponent powder may be added to the main component. The subcomponent may include a compound (referring to an oxide, a nitride, or the like) containing a cation of an element for substituting or replacing interstitially a lattice position of barium (Ba) and/or titanium (Ti), i.e., an A-site and/or a B-site, in a perovskite structure ($ABO_3$) of barium titanate ($BaTiO_3$).

A thickness of the dielectric layer 111 may be arbitrarily changed according to a capacitance design of the capacitor component 100, and a thickness of a layer thereamong, after firing, may be configured to be 0.1 μm to 10 μm in consideration of a size and capacitance of the body 110, but the present disclosure is not limited thereto. The thickness of the dielectric layer 111 may refer to an arithmetic mean value by measuring, multiple times in the L direction, a dimension of a dielectric layer 111 in the T direction, illustrated in the optical micrograph or SEM photograph of an L-T cross-section of the body 100, taken from a central portion in the W direction. In this case, the measurements multiple times in the L direction may refer to those equally spaced in the L direction, but are not limited thereto. Alternatively, the thickness of the dielectric layer 111 may refer to a value obtained by calculating an arithmetic mean value of dimensions in the T direction for each of the plurality of dielectric layers 111 illustrated in the photograph, and dividing the results by the total number of dielectric layers 111.

The first and second internal electrode layers 121 and 122 may be disposed to oppose each other, with the dielectric layer 111 interposed therebetween.

The first and second internal electrode layers 121 and 122 may be formed by printing a conductive paste containing a conductive metal on a dielectric green sheet for forming the dielectric layer 111, to a predetermined thickness, stacking the printed layers with the dielectric green sheet interposed therebetween in a stacking direction to form a stack body, and then sintering the stack body. The first and second internal electrode layers 121 and 122 may be formed to be alternately exposed from the third and fourth surfaces 3 and 4 of the body 110 formed by sintering the stack body, and may be electrically insulated from each other by a dielectric layer 111 interposed therebetween.

The first and second internal electrode layers 121 and 122 may be electrically connected to the first and second external electrodes 130 and 140, respectively, through portions alternately exposed from the third and fourth surfaces 3 and 4 of the body 110.

Therefore, when a voltage is applied to the first and second external electrodes 130 and 140, electrical charges may be accumulated between the first and second internal electrode layers 121 and 122 opposing each other. In this case, capacitance of the capacitor component 100 may be proportional to an area of a region in which the first and second internal electrode layers 121 and 122 overlap.

A thickness of each of the first and second internal electrode layers 121 and 122 may be determined to be within a range of 0.2 to 1.0 µm according to use thereof, for example, in consideration of a size and capacitance of the body 110, but the present disclosure is not limited thereto. For example, the thickness of the first internal electrode layer 121 may be calculated by the same measuring method as the above-described measuring method for the thickness of the dielectric layer 111.

The first and second internal electrode layers 121 and 122 may include nickel (Ni), copper (Cu), palladium (Pd), or alloys thereof, but the present disclosure is not limited thereto.

The upper and lower covers 112 and 113 may be formed of the same material as the dielectric layer 111 of the active region, except that an internal electrode layer is not included. Alternatively, the covers 112 and 113 may be formed using ceramic dielectric powder, which may be a material different from that of the dielectric layer 111. In this case, the formation of the covers 112 and 113 using the ceramic dielectric powder of a material different from that of the dielectric layer 111 may mean that, with respect to a dielectric powder used to form the covers 112 and 113 and a dielectric powder for forming the dielectric layer 111, elements thereof may be identical to each other, but ratios therebetween may be different from each other, may mean that types of elements of the aforementioned subcomponents are different from each other, and may mean that amounts of elements of the aforementioned subcomponents are different from each other.

The upper and lower covers 112 and 113 may be formed by stacking a single dielectric layer or two or more dielectric layers on and below the active region in the T direction, respectively, and may serve basically to prevent damage to the first and second internal electrode layers 121 and 122 caused by physical or chemical stress.

The first and second external electrodes 130 and 140 may include first electrode layers 131 and 141, second electrode layers 132 and 142 disposed on the first electrode layers 131 and 141, and third electrode layers 134, 135, 144, and 145 disposed on the second electrode layer 132 and 142, respectively.

The first external electrode 130 may be disposed on the third surface 3 of the body 110 and may be connected to the first internal electrode layer 121 exposed from the third surface 3 of the body 110. The second external electrode 140 may be disposed on the fourth surface 4 of the body 110 and may be connected to the second internal electrode layer 122 exposed from the fourth surface 4 of the body 110. With respect to the first and second external electrodes 130 and 140, only connection relationships thereof with the internal electrode layers 121 and 122 and positions thereof formed on the body 110 are different from each other, and the first to third electrode layers 131, 141, 132, 142, 134, and 144 and intermetallic compounds 133 and 143, may be included therein in the same manner, respectively. Therefore, hereinafter, for convenience of explanation, the first external electrode 130 disposed on the third surface 3 of the body 110 will be mainly described, and a description of the second external electrode 140 will be omitted. A description of the first external electrode 130 to be described later may be equally applied to the second external electrode 140.

The first electrode layer 131 may be in direct contact with the first internal electrode layer 121 exposed from the third surface 3 of the body 110 and may be directly connected to the first external electrode 130 and the first internal electrode layer 121, to ensure electrical conduction therebetween.

The first electrode layer 131 may include a metal component, and the metal component may be at least one of copper (Cu), silver (Ag), or nickel (Ni), but the present disclosure is not limited thereto.

The first electrode layer 131 may be a metal layer made of only the metal component. For example, the first electrode layer 131 may be formed by plating, and may include only a metal of copper (Cu), silver (Ag), nickel (Ni), and/or tin (Sn). As another example, the first electrode layer 131 may be formed by sputtering using a metal of copper (Cu), silver (Ag), nickel (Ni) and/or tin (Sn), as a target, and may contain only the above-described metal of copper (Cu), silver (Ag), nickel (Ni) and/or tin (Sn). In the latter case, a sputtering mask for masking a region, other than a region of forming the first electrode layer 131, among the third surface 3 of the body 110 is needed to be used due to a position of forming the first electrode layer 131, which will be described later.

First electrode layers 131 may be spaced apart from each other on the third surface 3 of the body 110, and may cover exposed regions of the first internal electrode layer 121 on the third surface 3 of the body 110, respectively. Since the first internal electrode layers 121 may be formed as a plurality of first internal electrode layers and exposed from the third surface 3 of the body 100 to be spaced apart from each other, the first electrode layer 131 may be formed on the third surface 3 of the body 100 as the same number thereof, as the number of which first internal electrode layers 121 are exposed from the third surface 3 of the body 100. In addition, the first electrode layers 131 may cover exposed surfaces of the first internal electrode layers 121, and may be formed to be spaced apart from each other. In addition, since each of the first internal electrode layers 121 has a linear-shaped exposed surface, extending in the W direction, on the third surface 3 of the body 110, each of the first electrode layers 131, respectively. The silver body 110 may be formed to have a linear shape, extending in the W direction, on the third surface 3. In this embodiment, due to structures of the first electrode layers 131 described above, an area of the second electrode layer 132 to be described later, contacting a surface of the first electrode layer 131 and a surface of the body 110 may increase. Therefore, coupling force between the external electrodes 130 and 140 and the body 110 may increase.

Figure 4:
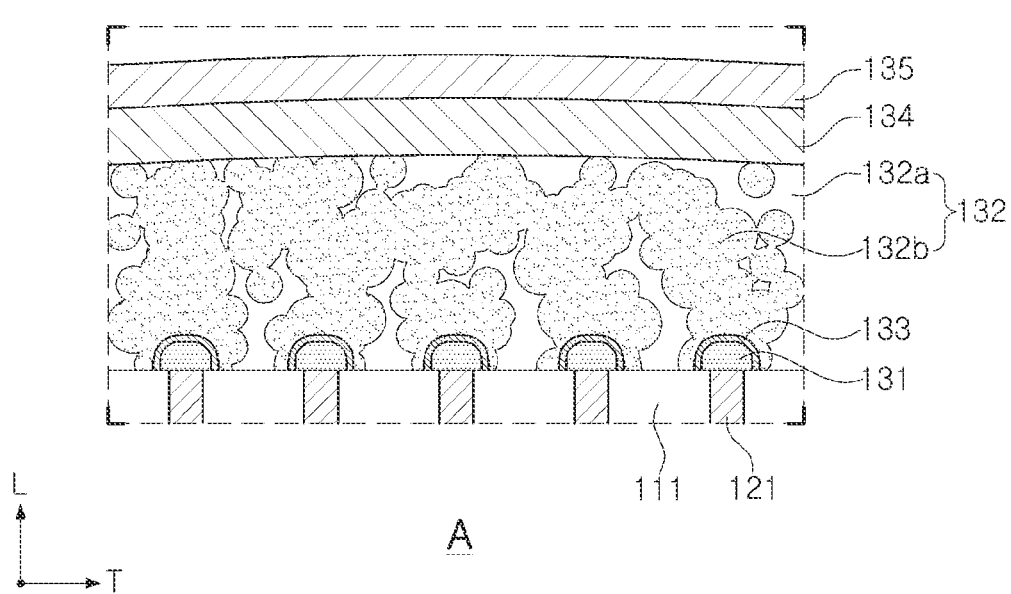
FIG. 4 is an enlarged view schematically illustrating portion A of FIG. 2.

FIG. 4 is an enlarged view schematically illustrating portion A of FIG. 2.

As illustrated in FIG. 4, the first external electrode 130 may include the first electrode layer 131, the second electrode layer 132, and the intermetallic compound 133, and may further include the third electrode layers 134 and 135. The second electrode layer 132 may include a base resin 132a and a conductive connection portion 132b.

The second electrode layer 132 may be disposed on the third surface 3 of the body 110 to cover the first electrode layer 131. The second electrode layer 132 may serve to electrically and mechanically bond the first electrode layer 131 and the third electrode layers 134 and 135. When the capacitor component 100 according to this embodiment is mounted on a substrate, the second electrode layer 132 may absorb tensile stress generated in a mechanical or thermal environment to prevent occurrence of cracks, and may serve to protect the capacitor component from bending impact of the substrate.

The second electrode layer 132 may be formed by applying, to the first electrode layer 131, a conductive paste in which a base resin and a plurality of metal particles are dispersed and drying and curing the applied first electrode layer 131. After the above process, the base resin of the conductive paste may become the base resin 132a of the second electrode layer 132, and the plurality of metal particles of the conductive paste may become the conductive connection portion 132b of the second electrode layer 132 by pressure and heat in the process. Specifically, the conductive paste may include a plurality of metal particles, and may include low-melting-point metal particles (e.g., tin (Sn), or an alloy containing tin (Sn), such as a tin (Sn)-bismuth (Bi) alloy, a tin (Sn)-lead (Pb) alloy, a tin (Sn)-copper (Cu) alloy, a tin (Sn)-silver (Ag) alloy, a tin (Sn)-silver (Ag)-copper (Cu) alloy, or the like) having a melting point, lower than a curing temperature of the base resin, and high-melting-point metal particles (e.g., copper, silver, or the like) having a melting point, higher than the melting point of the low-melting-point metal particles. The conductive connection portion 132b may be formed by melting the low-melting-point metal particles and reacting the melted low-melting-point metal particles with the high-melting-point metal particles by the pressure and heat in the above-described process.

The base resin 132a may serve to mechanically bond the first and third electrode layers 131 and 134. The base resin 132a may include a thermosetting resin having electrical insulation properties. The thermosetting resin may be, for example, an epoxy resin, but the present disclosure is not limited thereto.

The conductive connection portion 132b may include low-melting-point metal particles and high-melting-point metal particles, together, for the reason described above. As a non-limiting example, the conductive connection portion 132b may be formed of two or more alloys selected from tin (Sn), lead (Pb), indium (In), copper (Cu), silver (Ag), and bismuth (Bi). When the aforementioned conductive paste includes silver (Ag) and tin (Sn) powders, the conductive connection portion 132b may include $Ag_3Sn$.

Unlike a conventional method of forming an external electrode by firing, the conductive connecting portions 132b may be present to be randomly distributed in the base resin 132a, but may be included in the second electrode layer 132 to be connected to each other.

In a paste in which metal particles are dispersed is used as an electrode material, electrons may flow smoothly when metal-metal contact is used, but flow of electrons may be rapidly reduced when the base resin surrounds the metal particles.

In order to solve this problem, although conductivity may be improved by extremely reducing an amount of the base resin and increasing an amount of the metal to increase a contact ratio between metal particles, there may be a problem of lowering fixing strength of the external electrode due to a decrease in amount of resin.

In this embodiment, even though an amount of the thermosetting resin may not extremely decrease, since the contact ratio between the metal particles may increase due to the conductive connection portion, electrical conductivity in the second electrode layer may be improved without a problem of lowering the fixing strength of the external electrode. Therefore, ESR of the capacitor component may be reduced.

The intermetallic compound (IMC) 133 may be disposed on the first electrode layer 131, and may be in contact with the conductive connection portion 132b to connect the first electrode layer 131 and the conductive connection portion 132b. Therefore, electrical and mechanical bonding between the second electrode layer 132 and the first electrode layer 131 may be improved, to reduce contact resistance between the second electrode layer 132 and the first electrode layer 131.

The intermetallic compound 133 may be disposed only between the first electrode layer 131 and the second electrode layer 132. Specifically, the intermetallic compound 133 may be disposed only on an interface between the first and second electrode layers 131 and 132. Therefore, for the above reasons, the intermetallic compound 133 may not be disposed in a space spaced apart between adjacent first electrode layers 131 of the third surface 3 of the body 100, and the second electrode layer 132 may be disposed in the space to contact the third surface 3 of the body 100.

In one embodiment, a portion of the base resin 132a may be disposed between portions of the conductive connection portion 132b covering the adjacent first electrode layers 131, and may be in contact with the third surface 3 of the body 100.

In one embodiment, the intermetallic compound 133 may have a portion in contact with the third surface 3 of the body 100.

The intermetallic compound 133 may be formed by reacting the low-melting-point metal particles included in the conductive paste for forming the second electrode layer, and the metal component constituting the first electrode layer 131. Specifically, the low-melting-point metal particles included in the conductive paste for forming the second electrode layer may be melted by heat and pressure in a process of curing the conductive paste for forming the second electrode layer, and may be reacted with the metal component constituting the first electrode layer 131, to form the intermetallic compound 133. As a result, the intermetallic compound 133 may be present only on an interface between the first electrode layer 131 and the second electrode layer 132.

The intermetallic compound 133 may include low-melting-point metal particles and a metal component of the first electrode layer 131 for the above-mentioned reasons. As a non-limiting example, the intermetallic compound 133 may be an alloy of two or more selected from tin (Sn), lead (Pb), indium (In), copper (Cu), silver (Ag), nickel (Ni), and bismuth (Bi). When the first electrode layer 131 is composed of copper (Cu), the intermetallic compound 133 may include a Cu—Sn-based alloy. When the first electrode layer 131 is composed of silver (Ag), the intermetallic compound 133 may include an Ag—Sn-based alloy. When the first electrode layer 131 is composed of nickel (Ni), the intermetallic compound 133 may include a Ni—Sn-based alloy. The expression "the intermetallic compound 133 may include a Cu—Sn-based alloy" may mean that the alloy is an alloy consisting of Cu and Sn, or consists essentially of Cu and Sn and contains other metals or non-metal elements. This description may be equally applicable to the Ag—Sn-based alloy and the Ni—Sn-based alloy.

A thickness of the intermetallic compound 133 may be 2.0 μm to 5.0 μm.

In one example, a thickness of an element may mean a dimension of the element in a direction perpendicular to a planar surface of the element. The thickness of the element may be any one of an average thickness, a maximum thickness, a minimum thickness, or a thickness of the element measured in a predetermined region, unless contradictory to another definition explicitly described. In one example, the thickness of the element may be determined by defining a predetermined number (e.g., 5, but not limited thereto) of points to the left and the predetermined number (e.g., 5, but not limited thereto) of points to the right from a reference center point of the element at equal intervals (or non-equal intervals, alternatively), measuring a thickness of each of the points at equal intervals (or non-equal intervals, alternatively), and obtaining an average value therefrom. Alternatively, the thickness may be the maximum thickness or the minimum thickness of the multiple measurements. Alternatively, the thickness may be a thickness of the reference center point in the measured region. In one example, an optical microscope or a scanning electron microscope (SEM) may be used in the measurement, although the present disclosure is not limited thereto. Other measurement methods and/or tools appreciated by one of ordinary skill in the art, even if not described in the present disclosure, may also be used.

Although FIG. 4 illustrates that the conductive connection portion 132b and the intermetallic compound 133 form an interface therebetween, this is merely illustrative. As another non-limiting example, when the high-melting-point-metal particles included in the conductive paste for forming the second electrode layer 132 and the metal component of the first electrode layer 131 are the same, the conductive connection portion 132b and the intermetallic compound 133 may be formed together in the process of curing the conductive paste described above, and since they contain the same metal, an interface may not be formed therebetween.

In addition, the intermetallic compound 133 may be disposed on any one of the first electrode layers 131, to form a plurality of islands. In addition, the plurality of islands may be provided to form a layer.

The third electrode layers 134 and 135 may be disposed on the second electrode layer 132 to contact the conductive connection portion 132b. As a non-limiting example, each of the third electrode layers 134 and 135 may be a plating layer formed by electroplating. The third electrode layers 134 and 135 may have, for example, a structure in which a nickel plating layer 134 and a tin plating layer 135 are sequentially stacked. The nickel plating layer 134 may be in contact with the conductive connection portion 132b and the base resin 132a of the second electrode layer 132.

The second electrode layer 132 and the third electrode layers 134 and 135 may include a connection portion extending on the third surface 3 of the body, and a bend portion extending from the connection portion onto at least a portion of the first surface 1, the second surface 2, the fifth surface 5, and the sixth surface 6 of the body 110. The scope of this embodiment is not limited to the above description, and each of the second and third electrode layers 132, 134, and 135 may be variously modified to have, for example, an L shape, a C shape, or the like.

Figure 5:
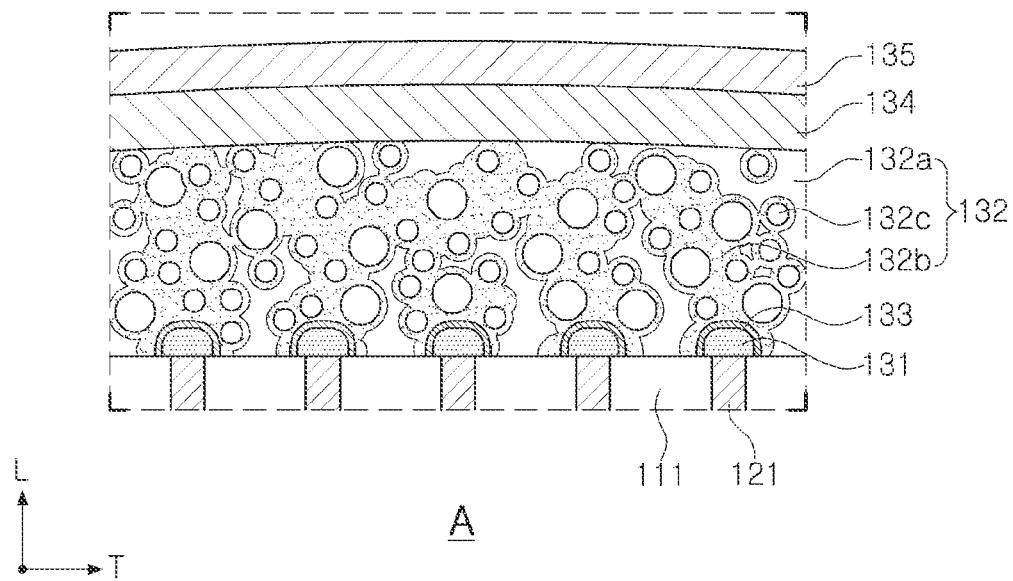
FIG. 5 is an enlarged view illustrating a portion of a capacitor component according to a modified embodiment, corresponding to portion A of FIG. 2.
Figure 6:
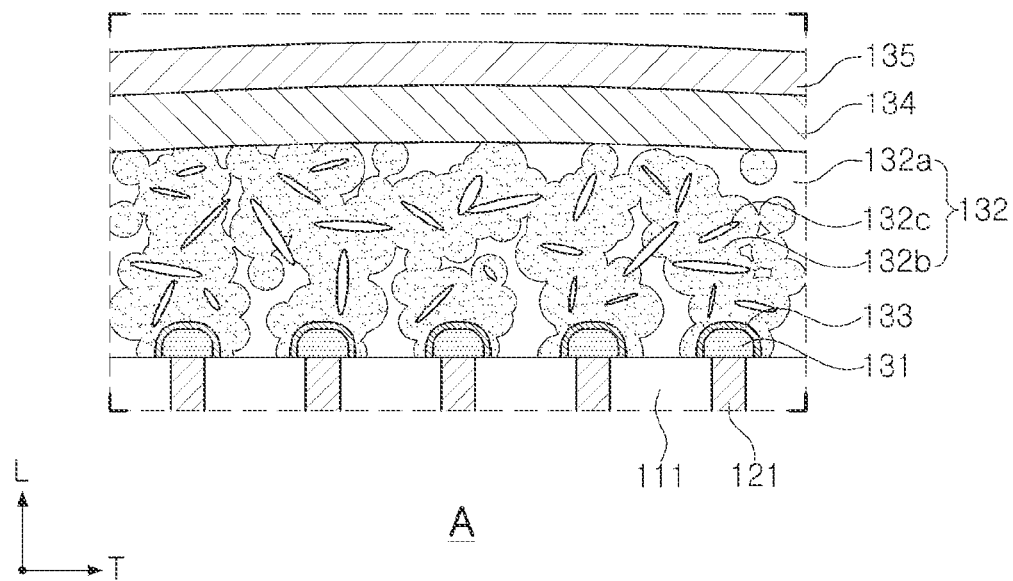
FIG. 6 is an enlarged view illustrating a portion of a capacitor component according to another modified embodiment, corresponding to portion A of FIG. 2.
Figure 7:
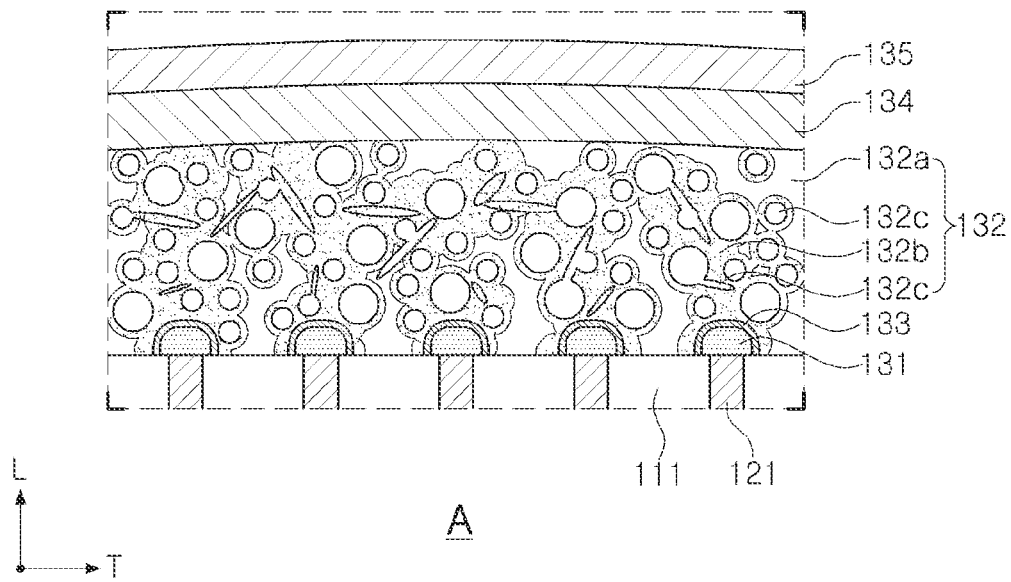
FIG. 7 is an enlarged view illustrating a portion of a capacitor component according to another modified embodiment, corresponding to portion A of FIG. 2.

FIG. 5 is an enlarged view illustrating a portion of a capacitor component according to a modified embodiment, corresponding to portion A of FIG. 2. FIG. 6 is an enlarged view illustrating a portion of a capacitor component according to another modified embodiment, corresponding to portion A of FIG. 2. FIG. 7 is an enlarged view illustrating a portion of a capacitor component according to another modified embodiment, corresponding to portion A of FIG. 2.

Referring to FIGS. 5 to 7, in modified examples of this embodiment, a second electrode layer 132 may further include a plurality of metal particles 132c. The plurality of metal particles 132c may be disposed in the second electrode layer 132, to be at least partially covered by a conductive connection portion 132b.

In a curing process for forming the second electrode layer 132, the plurality of metal particles 132c may be those in which at least a portion of high-melting-point metal particles included in a conductive paste for forming the second electrode layer is not reacted with low-melting-point metal particles, and remains.

Unlike the case of FIG. 4, in FIGS. 5 to 7, the plurality of metal particles 132c may be those in which the high-melting-point metal particles do not completely melted in the conductive paste, to be randomly dispersed in a base resin 132a of the second electrode layer 132, after a curing process thereof.

The metal particles 132c may include at least one of nickel (Ni), silver (Ag), silver-coated copper (Cu), tin (Sn)-coated copper, or copper.

The metal particles 132c included in the second electrode layer 132 may have only a spherical shape as illustrated in FIG. 5, may have only a flake shape as illustrated in FIG. 6, or may have a mixture of the spherical and flake shapes as illustrated in FIG. 7.

An average size of the metal particles 132c may be 0.2 to 20 μm. The average size of the metal particles 132c may refer to a diameter of any one of the plurality of metal particles 132c, based on the optical micrograph or SEM picture of an L-T cross-section, taken from a central portion of the W direction. The diameter may refer to a maximum value among a plurality of linear segments passing through a single metal particle 132c. Alternatively, the average size of the metal particles 132c may refer to an arithmetic average of three or more diameters from among the plurality of metal particles 132c shown in the photos, respectively. Alternatively, the average size of the metal particles 132c may refer to a diameter of an imaginary circle, based on any one of the plurality of metal particles 132c shown in the photos, assuming the imaginary circle having the same area as an area of a metal particle 132c, corresponding thereto. Alternatively, the average size of the metal particles 132c may refer to an arithmetic average obtained by converting at least three or more of the plurality of metal particles 132c shown in the photos into iso-area circles, described above, and calculating diameters of the iso-area circles.

Figure 8:
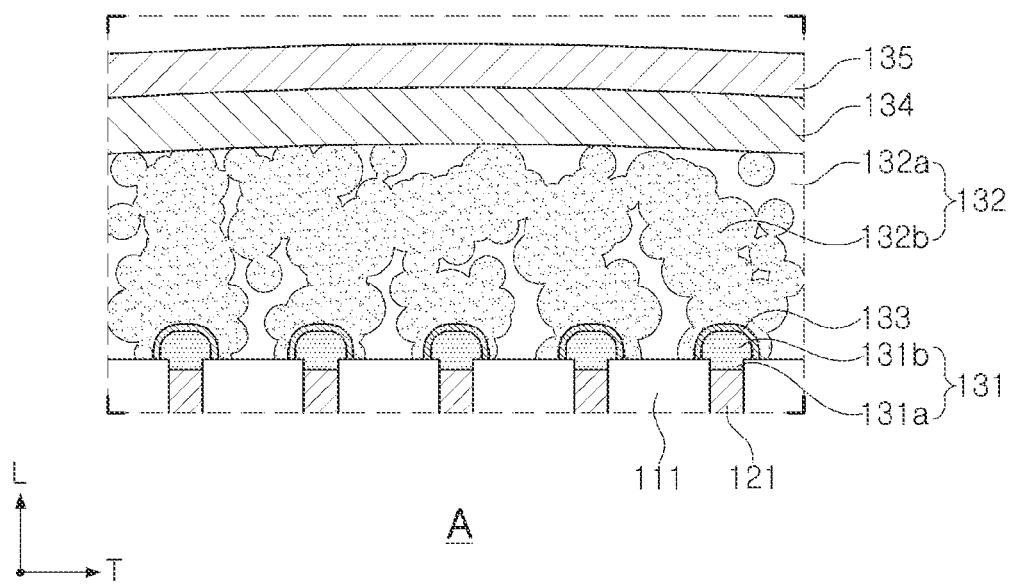
FIG. 8 is an enlarged view illustrating a portion of a capacitor component according to another embodiment of the present disclosure, corresponding to portion A of FIG. 2.

FIG. 8 is an enlarged view illustrating a portion of a capacitor component according to another embodiment of the present disclosure, corresponding to portion A of FIG. 2.

Referring to FIG. 8, a first electrode layer 131 applied to a capacitor component according to another embodiment of the present disclosure may include a buried portion 131a embedded in a third surface 3 of a body 110, and a protrusion 131b protruding from the third surface 3 of the body 110. In one embodiment, in a stacking direction in which the dielectric layers 111 are stacked, a thickness of the buried portion 131a, which is in contact with an internal electrode layer 121 or 122, may be smaller than a thickness of the protrusion 131b.

In a multilayer ceramic capacitor component formed by a sintering process, there may be a difference in degrees of sintering shrinkage between a ceramic material constituting a dielectric layer of a body and a metal material constituting an internal electrode layer of the body. For this reason, an end portion of the internal electrode layer in a buried form may be exposed from both end surfaces of the body of the component on which the sintering process is completed (two surfaces, from the internal electrode layer is exposed, and opposing each other in the L direction). In this embodiment, the first electrode layer 131 may be formed to fill a groove formed in the third surface 3 of the body 100. In this embodiment, due to the above-described structure of the first electrode layer 131, coupling force between external electrodes 130 and 140 and the body 110 may further increase. For example, as a result of disposing the buried portion 131a of the first electrode layer 131 in the body 100, bonding force and electrical connectivity between the external electrodes 130 and 140 and the body 110 may further increase due to an anchor effect.

Even in this embodiment, modified examples of FIGS. 5 to 7 described in embodiments of the present disclosure may be applied.

According to an embodiment of the present disclosure, bonding force and electrical connectivity between an internal electrode layer and an external electrode of a capacitor component may be improved.

In addition, equivalent series resistance (ESR) of a capacitor component may be reduced.

While example embodiments have been illustrated and described above, it will be apparent to those skilled in the art that modifications and variations could be made without departing from the scope of the present disclosure as defined by the appended claims.

What is claimed is:

1. A capacitor component comprising:
    a body including a dielectric layer and an internal electrode layer; and
    an external electrode disposed on one surface of the body, wherein the external electrode comprises:
        first electrode layers disposed on the one surface of the body to be spaced apart from each other, and covering a region of the one surface of the body through which the internal electrode layer is exposed;
        a second electrode layer including a base resin and a conductive connection portion disposed in the base resin, and disposed on the one surface of the body to cover the first electrode layers; and
        an intermetallic compound disposed only between each of the first electrode layers and the second electrode layer.

2. The capacitor component of claim 1, wherein the intermetallic compound is not disposed in a region of the one surface of the body in which adjacent first electrode layers are spaced apart from each other.

3. The capacitor component of claim 2, wherein the second electrode layer is in contact with the region of the one surface of the body in which the adjacent first electrode layers are spaced apart from each other.

4. The capacitor component of claim 2, wherein each of the first electrode layers is a metal layer including at least one of copper (Cu), silver (Ag), nickel (Ni), or tin (Sn).

5. The capacitor component of claim 4, wherein the intermetallic compound comprises at least one of copper (Cu), silver (Ag) and nickel (Ni), or tin (Sn).

6. The capacitor component of claim 5, wherein the conductive connection portion has a melting point lower than a curing temperature of the base resin.

7. The capacitor component of claim 6, wherein the conductive connection portion comprises tin (Sn), and at least one of copper (Cu) or silver (Ag).

8. The capacitor component of claim 7, wherein the conductive connection portion comprises $Ag_3Sn$.

9. The capacitor component of claim 5, wherein the external electrode further comprises a third electrode layer disposed on the second electrode layer and contacting the conductive connection portion.

10. The capacitor component of claim 9, wherein the third electrode layer comprises at least one of nickel (Ni) or tin (Sn).

11. The capacitor component of claim 9, wherein at least a portion of the second electrode layer further comprises a metal particle covered by the conductive connection portion.

12. The capacitor component of claim 11, wherein the metal particle has one of a spherical shape, a flake shape, or a mixture of the spherical and flake shapes.

13. The capacitor component of claim 12, wherein an average size of the metal particle is 0.2 μm to 20 μm.

14. The capacitor component of claim 5, wherein each of the first electrode layers has a buried portion embedded in the one surface of the body, and a protrusion protruding from the one surface of the body.

15. A capacitor component comprising:
    a body including a plurality of dielectric layers and a plurality of first and second internal electrode layers stacked with a dielectric layer interposed therebetween; and
    first and second external electrodes disposed on first and second surfaces of the body, respectively,
    wherein each of the first and second external electrodes comprises:
        first electrode layers disposed on the first or second surface of the body, connected to the first internal electrode layers or the second internal electrode layers, and spaced apart from each other;
        a second electrode layer including a base resin and a conductive connection portion disposed in the base resin, and disposed to cover the first electrode layers: and
        an intermetallic compound disposed between each of the first electrode layers and the second electrode layer.

16. The capacitor component of claim 15, wherein the intermetallic compound is provided in plural and spaced apart from one another.

17. The capacitor component of claim 15, wherein the intermetallic compound has a portion in contact with the first or second surface of the body.

18. The capacitor component of claim 15, wherein the second electrode layer has a portion in contact with a region of the first or second surface of the body between adjacent first electrode layers that are spaced apart from each other.

19. The capacitor component of claim 18, wherein a portion of the base resin is disposed between portions of the conductive connection portion covering the adjacent first electrode layers, and is in contact with the first or second surface of the body.

20. The capacitor component of claim 15, wherein each of the first and second external electrodes further comprises one or more third electrode layers disposed on the second electrode layer, and the conductive connection portion of the second electrode layer connects the first electrode layers to the one or more third electrode layers.

21. The capacitor component of claim 15, wherein each of the first electrode layers has a buried portion embedded in the one surface of the body, and a protrusion protruding from the one surface of the body.

22. The capacitor component of claim 15, wherein the conductive connection portion has a melting point lower than a curing temperature of the base resin.

23. A capacitor component comprising:
    a body including a dielectric layer and an internal electrode layer; and
    an external electrode disposed on one surface of the body, wherein the external electrode comprises:
first electrode layers disposed on the one surface of the body to be spaced apart from each other, and connected to the internal electrode layer;
a second electrode layer including a base resin and a conductive connection portion disposed in the base resin, and disposed to cover the first electrode layers; and
an intermetallic compound disposed between each of the first electrode layers and the second electrode layer, and
wherein the second electrode layer has a portion in contact with a region of the one surface of the body between adjacent first electrode layers that are spaced apart from each other.

24. The capacitor component of claim 23, wherein the intermetallic compound is provided in plural and spaced apart from one another.

25. The capacitor component of claim 23, wherein the intermetallic compound is not disposed in the region of the one surface of the body in which the adjacent first electrode layers are spaced apart from each other.

26. The capacitor component of claim 23, wherein each of the first electrode layers is a metal layer including at least one of copper (Cu), silver (Ag), nickel (Ni), or tin (Sn).

27. The capacitor component of claim 26, wherein the intermetallic compound comprises at least one of copper (Cu), silver (Ag) and nickel (Ni), or tin (Sn).

28. The capacitor component of claim 27, wherein the conductive connection portion has a melting point lower than a curing temperature of the base resin.

29. The capacitor component of claim 28, wherein the conductive connection portion comprises tin (Sn), and at least one of copper (Cu) or silver (Ag).

30. The capacitor component of claim 29, wherein the conductive connection portion comprises $Ag_3Sn$.

31. The capacitor component of claim 23, wherein the intermetallic compound has a portion in contact with the one surface of the body.

32. The capacitor component of claim 23, wherein a portion of the base resin is disposed between portions of the conductive connection portion covering the adjacent first electrode layers, and is in contact with the one surface of the body.

33. The capacitor component of claim 23, wherein each of the first electrode layers has a buried portion embedded in the one surface of the body, and a protrusion protruding from the one surface of the body.

34. The capacitor component of claim 33, wherein, in a stacking direction of the dielectric layer and the internal electrode layer, a thickness of the buried portion, which is in contact with the internal electrode layer, is smaller than a thickness of the protrusion.

35. The capacitor component of claim 23, wherein a thickness of the intermetallic compound ranges 2.0 μm to 5.0 μm.

* * * * *